United States Patent Office 3,316,257
Patented Apr. 25, 1967

3,316,257
NOVEL 5H-DIHYDROTHIOPYRANO[4,3-d]
PYRIMIDINES
Gerhard Ohnacker, Biberach an der Riss, Germany, assignor to Boehringer Ingelheim G.m.b.H., Ingelheim am Rhine, Germany, a corporation of Germany
No Drawing. Filed July 14, 1964, Ser. No. 382,652
Claims priority, application Germany, July 23, 1963,
T 24,350
7 Claims. (Cl. 260—246)

This invention relates to novel 5H-dihydrothiopyrano[4,3-d]pyrimidines and acid addition salts thereof, as well as to various methods of preparing these compounds.

More particularly, the present invention relates to 5H-dihydrothiopyrano[4,3-d]pyrimidines of the formula

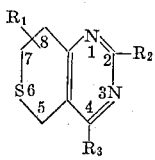

wherein $R_1$ is hydrogen, alkyl, aryl or aralkyl,
$R_2$ is hydrogen, alkyl, aryl, aralkyl, where said aryl and the aromatic moiety of said aralkyl may have one or more lower alkyl or lower alkoxy substituents attached thereto, or an amino group of the formula

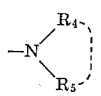

wherein $R_4$ and $R_5$, which may be identical to or different from each other, are hydrogen, straight or branched alkyl, hydroxyalkyl, alkenyl, aralkyl, aryl or, together with each other and the adjacent nitrogen atom, form a basic heterocycle which may comprise an additional heteroatom and may have one or more alkyl or aryl substituents attached thereto, and
$R_3$ is alkoxy, aryloxy, aralkoxy, where the aromatic moiety of said aryloxy and aralkoxy may have one or more halogen, lower alkyl or lower alkoxy substituents attached thereto, or an amino group of the formula

wherein $R_4$ and $R_5$ have the meanings defined above, and their non-toxic, pharmacologically acceptable acid addition salts.

The compounds of the present invention, that is, those embraced by Formula I above and their non-toxic acid addition salts, may be prepared by a number of different methods, some of them involving well known chemical reaction principles; however, the following methods are most convenient and produce the best yields of the desired end products.

Method A.—By exchanging the halogen substituent of a 4-halo-5H-dihydrothiopyrano[4,3-d]pyrimidine of the formula

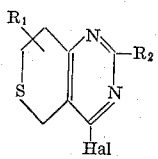

wherein $R_1$ and $R_2$ have the same meanings as in Formula I and Hal is a halogen, for any one of the substituents included in the definition of $R_3$ in Formula I.

(1) Thus, for the preparation of a compound of the Formula I wherein $R_3$ has the above indicated meanings other than an amino group, the exchange is effected by reacting a compound of the Formula II with a compound of the formula $$MeR_6 \quad (III)$$

wherein

Me is an alkali metal and
$R_6$ is alkoxy, aryloxy or aralkoxy, where the aromatic moiety of said aryloxy and aralkoxy may have one or more halogen, lower alkyl or lower alkoxy substituents attached thereto.

The reaction is advantageously carried out in the presence of an inert solvent, preferably of an alcohol of the formula $$R_6H \quad (IV)$$

wherein $R_6$ has the same meanings as in Formula III, and at elevated temperatures, preferably at the boiling point of the solvent.

(2) On the other hand, for the preparation of a compound of the Formula I wherein $R_3$ is an amino group, the exchange is effected by reacting a compound of the Formula II with an amine of the formula

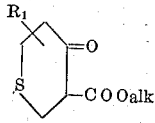

wherein $R_4$ and $R_5$ have the same meanings as in Formula Ia. The reaction is advantageously carried out in the presence of an inert organic solvent and of a compound capable of tying up or neutralizing the hydrogen halide liberated by the reaction, and at elevated temperatures, preferably at the boiling point of the particular inert solvent. Examples of suitable inert organic solvents are lower alkanols, aromatic hydrocarbons and halogenated hydrocarbons. An inorganic or tertiary organic base may be used as the compound for neutralizing or tying up the liberated hydrogen halide; however, a stoichiometric excess of the amine V may simultaneously be used as the solvent and hydrogen halide binding agent. If the amine V is highly volatile, it is preferred to perform the reaction in a closed vessel.

The starting compounds of the Formula II above for this method may themselves be prepared by known methods, for instance, by the process described in U.S. Patent No. 2,635,101 which comprises reacting a 4-oxo-thiopyran-3-carboxylic acid alkyl ester of the formula

wherein $R_1$ has the same meanings as in Formula I and alk is lower alkyl, with an amidine of the formula

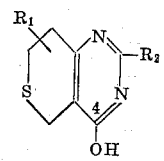

wherein $R_2$ has the same meanings as in Formula I, thereby forming as an intermediate product a 5H-thiopyrano[4,3-d]pyrimidine of the formula

wherein $R_1$ and $R_2$ have the meanings previously defined, and thereafter exchanging the hydroxyl group in the 4- position of the intermediate product for a halogen by reacting the intermediate with a phosphorus oxyhalide and/or a phosphorus pentahalide, preferably at elevated temperatures and in the presence of an inert solvent.

The intermediate 5H-thiopyrano[4,3-d]pyrimidines of the formula IX wherein $R_2$ is an amino group of the Formula Ia may also be prepared by reacting a 4-oxo-thiopyran-3-carboxylic acid alkyl ester of the Formula VII with an S-alkyl-isothiourea to form a 2-S-alkyl-4-hydroxy-5H-thiopyrano[4,3-d]pyrimidine of the formula

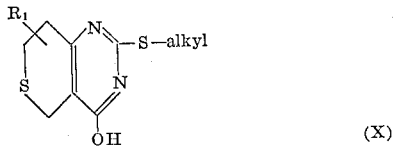

wherein $R_1$ has the same meanings as in Formula I, and thereafter reacting compound X with an amine of the Formula V above to exchange the —S— alkyl group for an amino group of the Formula Ia. Both of these reactions are also carried out pursuant to known procedures, that is, in the presence of an inert solvent at elevated temperatures.

Using the above-described procedures, the following previously unknown 4-halo-5H-thiopyrano[4,3-d]pyrimidine starting compounds and their intermediate 4-hydroxy-5H-thiopyrano[4,3-d]pyrimidine precursors of the generic formula

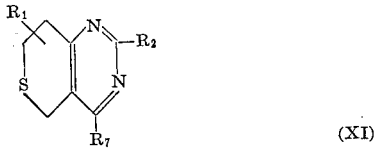

were prepared and identified:

| $R_1$ | $R_2$ | $R_7$ | M.P., °C. |
|---|---|---|---|
| H | H | OH | 232 |
| H | H | Cl | 243–244 |
| H | $C_2H_5$ | OH | (¹) |
| H | $C_2H_5$ | Cl | 171–173 |
| H | $C_3H_7$ | OH | (¹) |
| H | $C_3H_7$ | Cl | 220–222 |
| H | $(CH_3)_2CH$ | OH | 163–165 |
| H | $C_4H_9$ | OH | 146–148 |
| H | $C_6H_5$ | Cl | 213–214 |
| H | $C_6H_5CH_2$ | OH | 192–194 |
| H | $NH_2$ | Cl | 156–158 |
| H | $C_6H_{13}NH$ | OH | (¹) |
| H | $C_6H_{13}NH$ | Cl | 281–283 |
| H | $C_6H_5NH$ | OH | 145 |
| H | $C_6H_5NH$ | Cl | 252–254 |
| H | $(CH_3)_2N$ | OH | 69–70 |
| H | $(CH_3)_2N$ | Cl | 156–157 |
| H | $(C_4H_9)_2N$ | OH | (¹) |
| H | $(C_4H_9)_2N$ | Cl | 247–248 |
| H | Piperidino | OH | (¹) |
| H | do | Cl | 285–286 |
| H | Morpholino | OH | 103–105 |
| H | do | Cl | 264–265 |
| H | N′-methylpiperazino | OH | (¹) |
| H | do | Cl | (¹) |
| H | $CH_3$ | Cl | (¹) |
| H | $(CH_3)_2CH$ | Cl | 109 |
| H | H | OH | 169–171 |
| 7-$CH_3$ | $CH_3$ | OH | 176–178 |
| 7-$CH_3$ | $C_2H_5$ | OH | (¹) |
| 7-$CH_3$ | $C_2H_5$ | Cl | 148–150 |
| 7-$CH_3$ | $C_3H_7$ | OH | (¹) |
| 7-$CH_3$ | $C_3H_7$ | Cl | 178–180 |
| 7-$CH_3$ | $(CH_3)_2CH$ | OH | (¹) |
| 7-$CH_3$ | $(CH_3)_2CH$ | Cl | 42–44 |
| H | $C_4H_9$ | Cl | 53–55 |
| H | $C_6H_5CH_2$ | OH | 199–200 |
| 7-$CH_3$ | $CH_3S$ | OH | 159–161 |
| 7-$CH_3$ | $C_2H_5S$ | OH | 159–161 |
| H | $C_4H_9NH$ | OH | 224–226 |
| 7-$CH_3$ | Piperidino | OH | 248–251 |
| 7-$CH_3$ | Morpholino | OH | 64–66 |
| H | do | Cl | 228–230 |
| H | 2-methylmorpholino | OH | (¹) |
| H | do | Cl | (¹) |

¹ Non-distillable oil.

*Method B.*—For the preparation of a compound of the Formula I wherein both $R_2$ and $R_3$ are free amino groups (—$NH_2$), the desired end product is obtained by reacting a tetrahydrothiopyrone of the formula

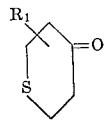

wherein $R_1$ has the same meanings as in Formula I, with dicyandiamide at elevated temperatures, preferably at a temperature above 100° C., and if desired in the presence of an inert organic solvent. In the event that no solvent is used, the reaction is advantageously carried out at the fusion temperature of the reaction mixture.

Those compounds of the Formula I obtained by these methods wherein either $R_2$ or $R_3$ or both are free amino groups, i.e., where $R_4$ and $R_5$ in Formula Ia are hydrogen, may if desired be subsequently transformed by customary methods into analogous compounds wherein $R_4$ and $R_5$ have the above recited meanings other than hydrogen. For instance, in order to convert the free amino group into an alkyl-substituted amino group, the amino-substituted compound is reacted with an alkyl halide or alkyl sulfate; hydroxyalkyl, alkenyl, aralkyl and aryl substituents may be introduced into the amino group in analogous fashion. In the event that a free amino group in the 2- and/or 4-position of the pyrimidine moiety is to be converted into a basic heterocyclic group, the free amino-substituted compound may be reacted with a dihaloalkane of 2 or more carbon atoms whose carbon chain may be interrupted by a heteroatom. However, the conversion of a free amino group to a substituted amino group may also be effected by reduction alkylation with the corresponding carbonyl compound, or by first acylating the free amino group and subsequently reducing the acyl radicals, for instance, with the aid of lithium aluminum hydride.

The tetrahydrothiopyrone starting compounds of the Formula VI for this method are known compounds and are described in Journal of Organic Chemistry 16, 232–238 (1951).

Compounds of the Formula I wherein $R_2$ or $R_3$ or both are free amino or substituted amino groups may be converted into non-toxic, pharmacologically acceptable acid addition salts by well known procedures, such as by reacting the free base with one or two molar equivalents of the desired inorganic or organic acid. Examples of non-toxic, pharmacologically acceptable acid addition salts are those formed with hydrochloric acid, sulfuric acid, phosphoric acid, tartaric acid, succinic acid, glutaric acid, citric acid, maleic acid, fumaric acid, lactic acid, 8-chlorotheophylline or the like.

The following examples further illustrate the present invention and will enable others skilled in the art to understand it more completely. It should be understood, however, that the invention is not limited to the particular examples given below.

EXAMPLE 1

*Preparation of 2-n-propyl-4-morpholino-7,8-dihydro-5H-thiopyrano[4,3-d]pyrimidine by Method A(2)*

A mixture of 6.3 gm. of 2-n-propyl-4-chloro-7,8-dihydro-5H-thiopyrano[4,3-d]pyrimidine and 10 gm. of morpholine was refluxed for twenty hours. Thereafter, the excess, unreacted morpholine was distilled off under reduced pressure, and the residue was stirred with water. The undissolved matter was separated by vacuum filtration, and the filter cake was washed with water, dried and recrystallized from hexane. The purified product, having a melting point of 81–83° C., was identified to be 2 - n - propyl - 4-morpholino-7,8-dihydro-5H-thiopyrano[4,3-d]pyrimidine of the formula

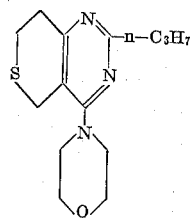

Using a procedure analogous to that described above, the following additional 4-basic substituted 7,8-dihydro-5H-thiopyrano[4,3-d]pyrimidines were prepared:

(a) 2 - methyl - 4-morpholino-7,8-dihydro-5H-thiopyrano[4,3 - d]pyrimidine, M.P. 107–109° C., from 2-methyl-4-chloro-7,8-dihydro-5H-thiopyrano[4,3-d] pyrimidine and morpholine.

(b) 2 - ethyl-4-pyrrolidino-7,8-dihydro-5H-thiopyrano[4,3-d]pyrimidine, M.P. 82–83° C., of the formula

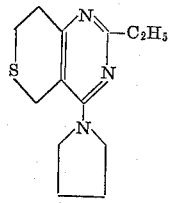

from 2-ethyl-4-chloro-7,8-dihydro-5H-thiopyrano[4,3-d]pyrimidine and pyrrolidine.

(c) 2 - n-propyl-4-pyrrolidino-7,8-dihydro-5H-thiopyrano[4,3-d]pyrimidine, M.P. 89–90° C., from 2-n-propyl-4-chloro - 7,8 - dihydro-5H-thiopyrano[4,3-d]pyrimidine and pyrrolidine.

(d) 2 - isopropyl - 4-pyrrolidino-7,8-dihydro-5H-thiopyrano[4,3-d]pyrimidine, M.P. 78–80° C., from 2-isopropyl - 4 - chloro-7,8-dihydro-5H-thiopyrano[4,3-d]pyrimidine and pyrrolidine.

(e) 2 - isopropyl-4-piperidino-7,8-dihydro-5H-thiopyrano[4,3-d]pyrimidine, M.P. 92–93° C., of the formula

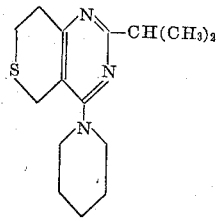

from 2-isopropyl-4-chloro-7,8-dihydro-5H-thiopyrano[4,3-d]pyrimidine and piperidine.

(f) 2 - phenyl-4-piperidino-7,8-dihydro-5H-thiopyrano[4,3-d]pyrimidine, M.P. 148–150° C., from 2-phenyl-4-chloro-7,8-dihydro-5H-thiopyrano[4,3-d]pyrimidine and piperidine.

(g) 2 - phenyl - 4-morpholino-7,8-dihydro-5H-thiopyrano[4,3-d]pyrimidine, M.P. 188–190° C., from 2-phenyl-4-chloro-7,8-dihydro-5H-thiopyrano[4,3-d]pyrimidine and morpholine.

(h) 2 - amino-4-di-n-butylamino-7,8-dihydro-5H- thiopyrano[4,3-d]pyrimidine, M.P. 101–103° C., of the formula

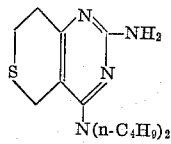

from 2-amino-4-chloro-7,8-dihydro-5H-thiopyrano[4,3-d]pyrimidine and di-n-butylamine.

(i) 2 - amino-4-pyrrolidino-7,8-dihydro-5H-thiopyrano[4,3-d]pyrimidine, M.P. 148–149° C., from 2-amino-4-chloro-7,8-dihydro-5H-thiopyrano[4,3-d]pyrimidine and pyrrolidine.

(j) 2 - amino-4-piperidino-7,8-dihydro-5H-thiopyrano[4,3-d]pyrimidine, M.P. 154–155° C., from 2-amino-4-chloro-7,8-dihydro-5H-thiopyrano[4,3-d]pyrimidine and piperidine.

(k) 2 - amino - 4-morpholino-7,8-dihydro-5H-thiopyrano[4,3-d]pyrimidine, M.P. 222–223° C., from 2-amino-4 - chloro - 7,8-dihydro-5H-thiopyrano[4,3-d]pyrimidine and morpholine.

(l) 2 - amino - 4-(N'-methyl-piperazino)-7,8-dihydro[4,3-d]pyrimidine, M.P. 200–201° C., of the formula

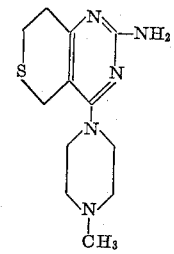

from 2-amino-4-chloro-7,8-dihydro-5H-thiopyrano[4,3-d] pyrimidine and N-methyl-piperazine.

(m) 2 - n - hexylamino-4-pyrrolidino-7,8-dihydro-5H-thiopyrano[4,3-d]pyrimidine, M.P. 74–76° C., of the formula

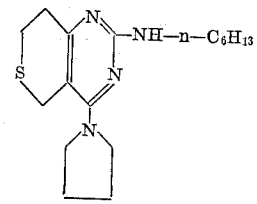

from 2-n-hexylamino-4-chloro-7,8-dihydro-5H-thiopyrano[4,3-d]pyrimidine and pyrrolidine.

(n) 2 - dimethylamino-1-pyrrolidino-7,8-dihydro-5H-thiopyrano[4,3-d]pyrimidine, M.P. 147–149° C., of the formula

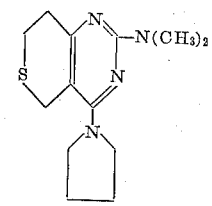

from 2-dimethylamino-4-chloro-7,8-dihydro - 5H - thiopyrano[4,3-d]pyrimidine and pyrrolidine.

(o) 2-dimethylamino-4-morpholino-7,8 - dihydro - 5H-thiopyrano[4,3-d]pyrimidine, M.P. 124–126° C., from 2-dimethylamino-4-chloro - 7,8 - dihydro-5H-thiopyrano[4,3-d]pyrimidine and morpholine.

(p) 2-piperidino-4-pyrrolidino - 7,8 - dihydro-5H-thiopyrano[4,3-d]pyrimidine, M.P. 134–136° C., from 2-piperidino-4-chloro-7,8-dihydro - 5H - thiopyrano[4,3-d]pyrimidine and pyrrolidine.

(q) 2,4-dipiperidino-7,8-dihydro - 5H - thiopyrano[4,3-d]pyrimidine, M.P. 132–134° C., from 2-piperidino-4-chloro-7,8-dihydro-5H-thiopyrano[4,3-d]pyrimidine and piperidine.

(r) 2-piperidino-4-morpholino - 7,8 - dihydro-5H-thiopyrano[4,3-d]pyrimidine, M.P. 139–140° C., from 2-piperidino-4-chloro-7,8-dihydro - 5H - thiopyrano[4,3-d]pyrimidine and morpholine.

(s) 2 - morpholino-4-pyrrolidino-7,8-dihydro-5H-thiopyrano[4,3-d]pyrimidine, M.P. 188–190° C., from 2-morpholino-4-chloro-7,8-dihydro-5H - thiopyrano[4,3-d]pyrimidine and pyrrolidine.

(t) 2-morpholino-4-piperidino - 7,8 - dihydro-5H-thiopyrano[4,3-d]pyrimidine, M.P. 130–131° C., from 2- morpholino-4-chloro-7,8-dihydro-5H - thiopyrano[4,3-d]pyrimidine and piperidine.

(u) 2,4-dimorpholino-7,8-dihydro - 5H - thiopyrano[4,3-d]pyrimidine, M.P. 176–178° C., from 2-morpholino-4-chloro-7,8-dihydro-5H-thiopyrano[4,3-d]pyrimidine and morpholine.

(v) 2-(N'-methyl-piperazino) - 4 - pyrrolidino-7,8-dihydro-5H-thiopyrano[4,3-d]pyrimidine, M.P. 155–157° C., from 2-(N'-methyl-piperazino)-4-chloro-7,8-dihydro-5H-thiopyrano[4,3-d]pyrimidine and pyrrolidine.

(w) 4 - pyrrolidino-7,8-dihydro-5H-thiopyrano[4,3-d]pyrimidine, M.P. 95–97° C., of the formula

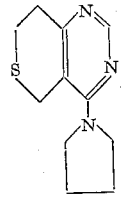

from 4-chloro-7,8-dihydro-5H - thiopyrano[4,3-d]pyrimidine and pyrrolidine.

(x) 2-ethyl-4-piperidino-7,8-dihydro - 5H - thiopyrano[4,3-d]pyrimidine, M.P. 70–72° C., from 2-ethyl-4-chloro-7,8-dihydro - 5H - thiopyrano[4,3-d]pyrimidine and piperidine.

(y) 2 - ethyl-4-morpholino-7,8-dihydro-5H-thiopyrano[4,3-d]pyrimidine, M.P. 83–84° C., from 2-ethyl-4-chloro-7,8-dihydro - 5H - thiopyrano[4,3-d]pyrimidine and morpholine.

(z) 2-isopropyl-4-morpholino - 7,8 - dihydro-5H-thiopyrano[4,3-d]pyrimidine, M.P. 93° C., from 2-isopropyl-4-chloro-7,8-dihydro - 5H - thiopyrano[4,3-d]pyrimidine and morpholine.

(aa) 2 - n-butyl - 4 - pyrrolidino-7,8-dihydro-5H-thiopyrano[4,3-d]pyrimidine, M.P. 70–72° C., from 2-n-butyl-4-chloro-7,8-dihydro-5H - thiopyrano[4,3-d]pyrimidine and pyrrolidine.

(bb) 2-n-butyl-4-morpholino - 7,8 - dihydro-5H-thiopyrano[4,3-d]pyrimidine, M.P. 81–83° C., from 2-n-butyl-4-chloro-7,8-dihydro-5H - thiopyrano[4,3-d]pyrimidine and morpholine.

(cc) 2 - benzyl-4-pyrrolidino - 7,8 - dihydro-5H-thiopyrano[4,3-d]pyrimidine, M.P. 109–110° C., of the formula

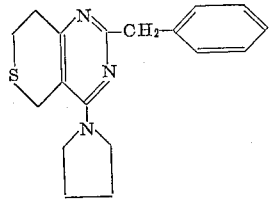

from 2-benzyl-4-chloro-7,8-dihydro - 5H - thiopyrano[4,3-d]pyrimidine and pyrrolidine.

(dd) 2 - benzyl - 4 - morpholino-7,8-dihydro-5H-thiopyranol[4,3-d]pyrimidine, M.P. 127–129° C., from 2-benzyl-4-chloro-7,8-dihydro - 5H - thiopyrano[4,3-d]pyrimidine and morpholine.

(ee) 2-morpholino-4-piperidino - 7 - methyl-7,8-dihydro-5H-thiopyrano[4,3-d]pyrimidine, M.P. 108–110° C., of the formula

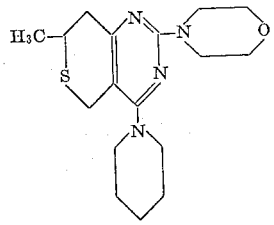

from 2-morpholino-4-chloro - 7 - methyl-7,8-dihydro-5H-thiopyranol[4,3-d]pyrimidine and piperidine.

(ff) 2,4 - dimorpholino-7-methyl-7,8-dihydro-5H-thiopyrano[4,3-d]pyrimidine, M.P. 126–128° C., from 2-morpholino - 4 - chloro - 7-methyl-7,8-dihydro-5H-thiopyrano[4,3-d]pyrimidine and morpholine.

(gg) 2-isopropyl-4-n-hexylamino - 7,8 - dihydro-5H-thiopyrano[4,3-d]pyrimidine, M.P. 85–87° C., from 2-isopropyl-4-chloro-7,8-dihydro - 5H - thiopyrano[4,3-d]pyrimidine and n-hexylamine.

(hh) 2-morpholino-4-n-hexylamino - 7,8-dihydro - 5H-thiopyrano[4,3-d]pyrimidine, M.P. 98–100° C., from 2-morpholino-4-chloro-7,8-dihydro-5H - thiopyrano[4,3-d]pyrimidine and n-hexylamine.

(ii) 2-morpholino - 4 - (2'-methyl-morpholino)-7,8-dihydro-5H-thiopyrano[4,3-d]pyrimidine, M.P. 151–153° C., of the formula

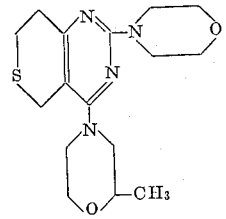

from 2 - morpholino-4-chloro-7,8-dihydro-5H-thiopyrano[4,3-d]pyrimidine and 2-methyl-morpholine.

(jj) 2 - (2' - methyl-morpholino)-4-morpholino-7,8-dihydro - 5H - thiopyrano[4,3-d]pyrimidine, M.P. 152–154° C., from 2-(2'-methyl-morpholino)-4-chloro-7,8-dihydro-5H-thiopyrano[4,3-d]pyrimidine and morpholine.

EXAMPLE 2

*Preparation of 2-dimethylamino-4-di-n-butylamino-7,8-dihydro-5H-thiopyrano[4,3-d]pyrimidine and its monomaleate by Method A(2)*

A mixture of 6 gm. of 2-dimethylamino-4-chloro-7,8-dihydro-5H-thiopyrano[4,3-d]pyrimidine and 15 gm. of di-n-butylamine was refluxed for twenty hours. Thereafter, the excess, unreacted dibutylamine was distilled off, and the residue was taken up in ether. The ethereal solution was washed three times with 50 cc.-portions of water and was then dried over sodium sulfate. The ether solvent was then evaporated, leaving an oily residue which was identified to be 2-dimethylamino-4-di-n-butylamino-7,8 - dihydro - 5H-thiopyrano[4,3-d]pyrimidine. The oily residue was weighed and dissolved in a small amount of absolute ethanol. The ethanolic solution was admixed with one molar equivalent of maleic acid, the mixture was evaporated in vacuo, the residue was stirred with a small amount of petroleum ether, and the crystalline mass obtained thereby was vacuum filtered. The filter cake was recrystallized from acetone, yielding 2-dimethylamino - 4 - di - n - butylamino-7,8-dihydro-5H-thiopyrano[4,3-d]pyrimidine monomaleate having a melting point of 109–111° C.

In analogous manner the following 4-basic substituted 7,8 - dihydro - 5H-thiopyrano[4,3-d]pyrimidines and their maleates or hydrochlorides were prepared:

(a) 2 - dimethylamino - 4 - piperidino-7,8-dihydro-5H-thiopyrano[4,3-d]pyrimidine and its maleate from 2-dimethylamino - 4 - chloro-7,8-dihydro-5H-thiopyrano[4,3-d]pyrimidine and maleic acid. The maleate had a melting point of 134–136° C.

(b) 2 - methyl - 4 - n-hexylamino-7,8-dihydro-5H-thiopyrano[4,3-d]pyrimidine and its maleate from 2-methyl-4-chloro-7,8-dihydro-5H-thiopyrano[4,3-d]pyrimidine, n-hexylamine and maleic acid. The maleate had a melting point of 135–137° C.

(c) 2 - n - propyl - 4-morpholino-7-methyl-7,8-dihydro-5H - thiopyrano[4,3 - d]pyrimidine and its hydrochloride from 2 - n-propyl-4-chloro-7-methyl-7,8-dihydro-5H-thiopyrano[4,3 - d]pyrimidine, morpholine and hydrochloric acid. The hydrochloride had a melting point of 225–227° C.

(d) 2 - isopropyl - 4-morpholino-7-methyl-7,8-dihydro-5H - thiopyrano[4,3 - d]pyrimidine and its hydrochloride from 2 - isopropyl-4-chloro-7-methyl-7,8-dihydro-5H-thiopyrano[4,3 - d]pyrimidine, morpholine and hydrochloric acid. The hydrochloride had a melting point of 228–230° C.

(e) 2 - methyl - 4-(2'-methyl-morpholino)-7,8-dihydro-5H-thiopyrano[4,3-d]pyrimidine and its maleate from 2-methyl - 4 - chloro-7,8-dihydro-5H-thiopyrano[4,3-d]pyrimidine, 2-methyl-morpholine and maleic acid. The maleate had a melting point of 130–131° C.

(f) 2 - ethyl-4-n-hexylamino-7-methyl-7,8-dihydro-5H-thiopyrano[4,3-d]pyrimidine and its hydrochloride from 2 - ethyl - 4 - chloro-7-methyl-7,8-dihydro-5H-thiopyrano [4,3-d] pyrimidine, n-hexylamine and hydrochloric acid. The hydrochloride had a melting point of 206–208° C.

(g) 2 - ethyl - 4-morpholino-7-methyl-7,8-dihydro-5H-thiopyrano[4,3-d]pyrimidine and its hydrochloride from 2 - ethyl - 4 - chloro-7-methyl-7,8-dihydro-5H-thiopyrano [4,3-d]pyrimidine, morpholine and hydrochloric acid. The hydrochloride had a melting point of 235–238° C.

(h) 2 - n - propyl - 4 - n - hexylamino-7,8-dihydro-5H-thiopyrano[4,3-d]pyrimidine and its hydrochloride from 2 - n - propyl - 4 - chloro-7,8-dihydro-5H-thiopyrano[4,3-d]pyrimidine, n-hexylamine and hydrochloric acid. The hydrochloride had a melting point of 196–197° C.

(i) 2 - n - propyl - 4 - n - hexylamino-7-methyl-7,8-dihydro-5H-thiopyrano[4,3-d]pyrimidine and its hydrochloride from 2 - n - propyl-4-chloro-7-methyl-7,8-dihydro-5H-thiopyrano[4,3-d]pyrimidine, n-hexylamine and hydrochloric acid. The hydrochloride had a melting point of 179–181° C.

(j) 2 - n - propyl - 4 - (2'-methyl-morpholino)-7,8-dihydro-5H-thiopyrano[4,3-d]pyrimidine and its hydrochloride from 2-n-propyl-4-chloro-7,8-dihydro-5H-thiopyrano [4,3-d]pyrimidine, 2-methyl-morpholine and hydrochloric acid. The hydrochloride had a melting point of 178–180° C.

(k) 2 - isopropyl - 4 - n - hexylamino-7-methyl-7,8-dihydro - 5H - thiopyrano[4,3-d]pyrimidine and its maleate from 2 - isopropyl-4-chloro-7-methyl-7,8-dihydro-5H-thiopyrano[4,3-d]pyrimidine, n-hexylamine and maleic acid. The maleate had a melting point of 140–145° C.

(l) 2 - n - butyl - 4-n-hexylamino-7,8-dihydro-5H-thiopyrano[4,3-d]pyrimidine and its hydrochloride from 2-n-butyl - 4 - chloro - 7,8 - dihydro-5H-thiopyrano[4,3-d]pyrimidine, n-hexylamine and hydrochloric acid. The hydrochloride had a melting point of 199–201° C.

(m) 2 - n - butyl-4-(β-phenylethyl-amino)-7,8-dihydro-5H-thiopyrano[4,3-d]pyrimidine and its hydrochloride of the formula

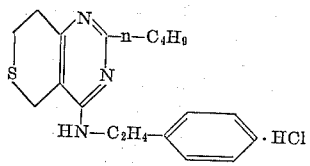

from 2 - n-butyl-4-chloro-7,8-dihydro-5H-thiopyrano[4,3-d]pyrimidine, β-phenylethyl-amine and hydrochloric acid. The hydrochloride had a melting point of 224–226° C.

(n) 2 - n - butyl-4-(2'-methyl-morpholino)7,8-dihydro-5H - thiopyrano[4,3 - d]pyrimidine and its hydrochloride from 2 - n-butyl-4-chloro-7,8-dihydro-5H-thiopyrano[4,3-d]pyrimidine, 2-methyl-morpholine and hydrochloric acid. The hydrochloride had a melting point of 168–169° C.

EXAMPLE 3

Preparation of 2-dimethylamino-4-n-butoxy-7,8-dihydro-5H-thiopyrano[4,3-d]pyrimidine by Method A(1)

4.6 gm. of 2-dimethylamino-4-chloro-7,8-dihydro-5H-thiopyrano[4,3-d]pyrimidine were added to a solution of 0.46 gm. of sodium in 100 cc. of dry butanol, and the resulting mixture was refluxed for twenty hours. Thereafter, the butanol was distilled off, and the residue was admixed with water. The precipitate formed thereby was separated by vacuum filtration, and the filter cake was washed several more times with water. It was then recrystallized from methanol, yielding a solid substance having a melting point of 46–47° C. which was identified to be 2 - dimethylamino-4-n-butoxy-7,8-dihydro-5H-thiopyrano[4,3-d]pyrimidine of the formula

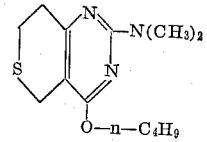

In analogous fashion the following additional 2-basic substituted-4-lower alkoxy - 7,8 - dihydro-5H-thiopyrano-[4.3-d]pyrimidine was prepared:

(a) 2-amino-4-n-butoxy - 7,8 - dihydro-5H-thiopyrano-[4,3-d]pyrimidine, M.P. 98–99° C., from 2-amino-4-chloro-7,8-dihydro-5H-thiopyrano[4,3-d]pyrimidine and sodium butylate.

EXAMPLE 4

Preparation of 2-morpholino-4-dimethylamino-7,8-dihydro-5H-thiopyrano[4,3-d]pyrimidine by Method A(2)

A solution of 5.4 gm. of 2-morpholino-4-chloro-7,8-dihydro-5H-thiopyrano[4,3-d]pyrimidine in 30 cc. of ethanol was placed into a cooled autoclave, and 15 cc. of liquefied dimethylamine were added. The autoclave was then closed and the contents were heated at 150° C. for twenty hours. Thereafter, the autoclave was allowed to cool, the unreacted dimethylamine was allowed to escape, and the ethanol was removed by distillation. The residue was admixed with water, the precipitate formed thereby was separated by vacuum filtration, and the filter cake was washed with water; it was then recrystallized from acetone, yielding a solid substance having a melting point of 124–127° C. which was identified to be 2-morpholino-4-dimethylamino - 7,8 - dihydro-5H-thiopyrano-[4,3-d]pyrimidine.

In analogous fashion the following 4-basic substituted and 2,4-di-basic substituted 7,8-dihydro-5H-thiopyrano-[4,3-d]pyrimidines were prepared:

(a) 2-phenyl-4-dimethylamino-7,8-dihydro - 5H - thiopyrano[4,3-d]pyrimidine, M.P. 134–136° C., from 2-phenyl-4-chloro - 7,8 - dihydro-5H-thiopyrano[4,3-d]pyrimidine and liquefied dimethylamine.

(b) 2,4-bis-dimethylamino-7,8-dihydro-5H-thiopyrano-[4,3-d]pyrimidine from 2-dimethylamino-4-chloro-7,8-dihydro-5H-thiopyrano[4,3-d]pyrimidine and liquefied dimethylamine. Its monomaleate had a melting point of 105–107° C.

(c) 2-(N'-methyl-piperazino) - 4 - isopropylamino-7,8-dihydro-5H-thiopyrano[4,3-d]pyrimidine, M.P. 114–116° C., from 2-(N'-methyl-piperazino)-4-chloro-7,8-dihydro-5H-thiopyrano[4,3-d]pyrimidine and isopropylamine.

EXAMPLE 5

Preparation of 2,4-diamino-7,8-dihydro-5H-thiopyrano-[4,3-d]pyrimidine by Method B A mixture consisting of 3.5 gm. of 1,2,5,6-tetrahydro-4H-thiopyrone-(4) and 2.5 gm. of dicyandiamide was heated for two hours 170° C.; the molten mass initially formed began to solidify again after about twenty minutes of heating. The reaction mass was allowed to cool and was then stirred with 50 cc. of 2 N hydrochloric acid. The undissolved matter was filtered off, and the filtrate was made alkaline with 1 N sodium hydroxide. The precipitate formed thereby was separated by vacuum filtration, washed with water until neutral, and was recrystallized from dimethylformamide. The product, having a melting point of 298–300° C. (decomposition), was identified to be 2,4-diamino-7,8-dihydro-5H-thiopyrano[4,3-d]-pyrimidine of the formula

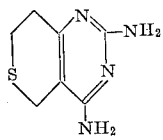

The compounds of the present invention, that is, those embraced by Formula I above and the non-toxic, pharmacologically acceptable acid addition salts of those compounds wherein either $R_2$ or $R_3$ or both are basic substituents of the Formula Ia, have useful pharmacodynamic properties. More particularly, they exhibit sedative, antipyretic, antiphlogistic and analgesic activities in animals.

For therapeutic purposes the compounds according to the present invention are administered perorally or parenterally as active ingredients in customary dosage unit compositions consisting essentially of an inert, physiologically compatible carrier and one dosage unit of the active ingredient, such as tablets, coated pills, hypodermic solutions, wafer capsules, rectal suppositories, suspensions or the like. One dosage unit of the compounds of the invention is 50–250 mgm., preferably 100–150 mgm.

The following examples illustrate a few dosage unit compositions comprising a compound of the invention as an active ingredient. The parts are parts by weight unless otherwise specified.

EXAMPLE 6

*Hypodermic solution*

The solution is compounded from the following ingredients:

| | |
|---|---|
| 2-isopropyl-4-morpholino-7,8-dihydro-5H-thiopyrano[4,3-d]pyrimidine _____parts__ | 100.0 |
| Sodium pyrosulfite _____do__ | 2.0 |
| Double-distilled water, q.s. ad ____ parts by vol.__ | 2000.0 |

*Compounding procedure.*—Double-distilled water is boiled and cooled to room temperature, and the sodium pyrosulfite and the thiopyranopyrimidine compound are dissolved therein in that order in an atmosphere of nitrogen. The resulting solution is diluted to the required volume wtih boiled double-distilled water and is filtered until free from suspended particles. The filtered solution is filled into brown 2 cc.-ampules in an atmosphere of nitrogen, and the ampules are sterilized for twenty minutes at 120° C. and then sealed. Each ampule contains 100 mgm. of the active ingredient.

EXAMPLE 7

*Coated pills*

The pill cores are compounded from the following ingredients:

| | Parts |
|---|---|
| 2-methyl-4-morpholino-7,8-dihydro-5H-thiopyrano[4,3-d]pyrimidine | 150.0 |
| Lactose | 50.0 |
| Potato starch | 55.0 |
| Talcum | 15.0 |
| Gelatin | 7.0 |
| Magnesium stearate | 3.0 |
| Total | 280.0 |

*Compounding procedure.*—The thiopyranopyrimidine compound is thoroughly admixed with the lactose, the potato starch and the talcum, and the mixture is moistened with an aqueous 10% solution of the gelatin. The moistened mixture is then passed through a 1.5 mm.-mesh screen and the resulting granulate is dried at 40° C. The dry granulate is again passed through the screen and is then thoroughly admixed with the magnesium stearate. The resulting mixture is pressed into 280 mgm. pill cores. The pill cores are then coated with a thin shell consisting essentially of talcum and sugar. The coated pills, weighing about 450 mgm. each, are finally polished with beeswax. Each pill contains 150 mgm. of the active ingredient.

EXAMPLE 8

*Wafer capsules*

The contents of the capsules are compounded from the following ingredients:

| | Parts |
|---|---|
| 2-isopropyl-4-morpholino-7,8-dihydro-5H-thiopyrano[4,3-d]pyrimidine | 100.0 |
| Lactose, crystalline | 80.0 |
| Talcum | 20.0 |
| Total | 200.0 |

*Compounding procedure.*—The thiopyranopyrimidine compound is passed through a 0.75 mm.-mesh screen and is then thoroughly admixed with the remaining ingredients. The resulting mixture is filled in 200 mgm. portions into wafer capsules of suitable size. Each capsule contains 100 mgm. of the active ingredient.

EXAMPLE 9

*Suppositories*

The suppository composition is compounded from the following ingredients:

| | Parts |
|---|---|
| 2-methyl-4-morpholino-7,8-dihydro-5H-thiopyrano[4,3-d]pyrimidine | 100.0 |
| Cocoa butter | 1600.0 |
| Total | 1700.0 |

*Compounding procedure.*—The cocoa butter is melted and at 40° C. the finely powdered thiopyranopyrimidine compound is stirred in. The resulting mixture is homogenized and is poured at about 35° C. into cooled suppository molds, each holding 1700 mgm. of the mixture. Each suppository contains 100 mgm. of the active ingredient.

EXAMPLE 10

*Aqueous suspension for oral ingestion*

The suspension is compounded from the following ingredients:

| | Parts |
|---|---|
| 2-methyl-4-morpholino-7,8-dihydro-5H-thiopyrano[4,3-d]pyrimidine | 2.0 |
| Carboxymethylcellulose, high visc. | 0.5 |
| Colloidal silicic acid | 1.5 |
| p-Hydroxybenzoic acid methyl ester | 0.07 |
| p-Hydroxybenzoic acid propyl ester | 0.03 |
| Essence of cocoa | 1.5 |
| Sugar | 22.0 |
| Glycerin | 10.0 |
| Distilled water | 72.4 |
| Total | 100.0 |

*Compounding procedure.*—The distilled water is heated to 80° C., the p-hydroxybenzoic acid esters are dissolved therein, the silicic acid is stirred into the solution, and then a mixture of the sugar and the carboxymethylcellulose is dissolved in the aqueous mixture. The composition is then cooled to room temperature and the glycerin and the essence of cocoa are added. Finally, the thiopyranopyrimidine compound is stirred in, and the mixture is homogenized. 5 cc. of the resulting suspension contain 100 mgm. of the active ingredient.

Although the above dosage unit composition examples illustrate only two specific compounds of the generic class embraced by Formula I as active ingredients, it should be understood that any of the other compounds coming thereunder may be substituted for the specific compounds used in Examples 6 to 10. Moreover, it will be evident to others skilled in the art that the amounts of

I claim:

1. A compound selected from the group consisting of 7,8-dihydro-5H-thiopyrano[4,3-d]pyrimidine substitution products of the formula

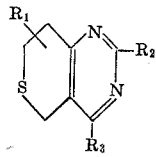

wherein $R_1$ is selected from the group consisting of hydrogen and lower alkyl, $R_2$ is selected from the group consisting of hydrogen, lower alkyl, phenyl, benzyl, amino, mono-lower alkyl-amino, di-lower alkyl-amino, morpholino, lower alkyl-morpholino, piperidino and N'-lower alkyl-piperazino, and $R_3$ is selected from the group consisting of lower alkoxy, amino, (phenyl-lower alkyl)-amino, mono-lower alkyl-amino, di-lower alkyl-amino, morpholino, lower alkyl-morpholino, pyrrolidino, piperidino and N-lower alkyl-piperazino, and their non-toxic, pharmacologically acceptable acid addition salts.

2. 2,4-dimorpholino-7,8-dihydro-5H-thiopyrano[4,3-d]pyrimidine.

3. 2-dimethylamino-4-morpholino-7,8-dihydro-5H-thiopyrano[4,3-d]pyrimidine.

4. 2-methyl-4-morpholino-7,8-dihydro-5H - thiopyrano[4,3-d]pyrimidine.

5. 2-ethyl-4-morpholino-7,8-dihydro - 5H - thiopyrano[4,3-d]pyrimidine.

6. 2-isopropyl-4-morpholino-7,8-dihydro - 5H - thiopyrano[4,3-d]pyrimidine.

7. The process of preparing a compound of the formula

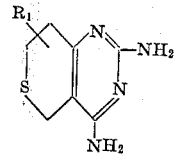

wherein $R_1$ is selected from the group consisting of hydrogen and lower alkyl, which comprises reacting a tetrahydrothiopyrone of the formula

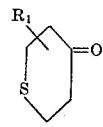

wherein $R_1$ has the meanings defined above, with dicyandiamide at a temperature above 100° C., and recovering the reaction product.

No references cited.

ALEX MAZEL, *Primary Examiner.*

JOSE TOVAR, *Assistant Examiner.*